July 9, 1957 J. BUDNICK ET AL 2,798,744
SEAL TIGHT CONNECTOR FOR ELECTRICAL CONDUITS AND FITTINGS
Filed Nov. 15, 1954

INVENTOR
JOSEPH BUDNICK
MORRIS RUDMAN
BY
Eugene S. Lovette
ATTORNEY

2,798,744

SEAL TIGHT CONNECTOR FOR ELECTRICAL CONDUITS AND FITTINGS

Joseph Budnick and Morris Rudman, New York, N. Y., assignors to Electrical Fittings Corporation, Woodside, N. Y., a corporation of New York Application November 15, 1954, Serial No. 468,983

14 Claims. (Cl. 285—149)

The present invention relates to a seal tight connector and, in particular, to a vapor, liquid seal tight and dust-proof connector adaptable for use with flexible metal conduit hose which hose is used for electrical raceways.

Liquid tight flexible metal conduit is used as an electrical raceway when the installation demands, first, a flexible line, and second, a seal out of all moisture, oil, corrosive fluids or vapors and dust. The liquid tight flexible metal conduit consists of a spiraled armor of interlocked metal covered by a plastic sheath. When the need of liquid tight flexible conduit arises, it is similarly necessary that the connectors used therewith also maintain the seal tight characteristic of the raceway.

Prior art seal tight connectors, in one respect or another, are disposed to mechanical limitations. For example, for one prior art connector the seal tight connection is effected by a folded over metallic sleeve which is collapsed about the conduit at one end and gripped by a metallic connector body at the other end. The limitations to this connector are many. First, the connector must be disassembled in order to be used. Second, the connector is not reusable; the collapsed sleeve must be replaced for another conduit connection. Furthermore, the metal-to-metal contact between sleeve and connector body does not provide a perfect fluid tight or oil tight seal.

Another prior art connector makes use of a plastic grip ring to seal against the plastic sheath of the conduit. This connector positively grounds the inner spiraled surface of the conduit by means of a tapered body wedge. This connector also has its limitations. It provides only fair sealing characteristics. It has been discovered that a plastic to plastic contact does not provide a perfect oil seal because plastic does not compress, for example, as well as rubber. Furthermore, the tapered wedge into which the end of the conduit is inserted is liable to crush the end of conduit engaged therewith. When this happens and the connection for any reason has to be opened, reassembly of the connection requires either cutting the conduit end square to discard the crushed portion, or replacement of the conduit. In addition, use of the connector has shown poor pull out characteristics. There is the tendency of conduit to escape the hold or grip of connector by reason of a pull out force because this particular connector has no positive thread to interlock into the convolutions of armor, but instead has a smooth tapered sleeve.

It is the purpose of the instant invention to provide a liquid, gas and dust seal tight connector of improved sealing, gripping and pull out characteristics. A connector built in accordance with the instant invention provides a seal tight, leak proof connection without crushing the conduit line upon connection therewith. The invention offers a connector design which is simple to manufacture and equally simple to use. Of great importance is that once assembled, the connector does not have to be disassembled to be used.

The invention contemplates a threaded metallic sleeve permanently locked in the connector body. The sleeve is dimensioned so that the conduit hose is pushed straight into the connector. The hose slips into the space between sleeve and connector body. There is no twisting, turning or force required to effect the assembly. The threads of the sleeve are gauged to engage the armored convolutions of the conduit upon tightening of the connection. When the connection is made firm, the engagement of sleeve and armored surface provides a positive ground connection for the latter. A metal gland ring is disposed about the sheath or plastic cover of the conduit. The ring is wedged between these bodies to effect the improved leak proof seal. The seal tight connection is accomplished by taking up the connector nut which is designed to engage the ring. The nut may be either hand or wrench tightened as desired; however wrench tightening is prescribed for a perfect seal tight connection. Use of a tapered surface along the portion of the connector body contacting the ring causes the ring to engage the conduit in a manner to prevent any pull out of the conduit from the connector.

It is therefore a principal object of this invention to provide a novel seal tight connector for liquid tight flexible metal conduit which connector seals out liquid, vapor and dust and protects the conduit against damage.

It is a further object of the instant invention to provide a seal tight connector for liquid tight metal hose that does not have to be disassembled in order to effect the hose connection therewith, and which connection can be brought about by pushing the hose straight into the connector.

It is a further object of the instant invention to provide a novel gland ring connection in a seal tight connector to bring about improved pull out characteristics; the connector body includes a tapered inner surface which causes the ring to bind the hose. The ring design permits a hand tight connection except that a wrench connection is prescribed for a perfect liquid tight seal.

It is a further object of this invention to provide a seal tight connector which provides a positive ground for the armored convolutions of the hose connected thereto.

It's another object of this invention to provide a seal tight connector that is economical in its manufacture and use; and which fits all thicknesses and convolutions of standard liquid tight flexible metal conduit.

Further objects and advantages of our invention will become apparent from the following description and figures in which.

Figure 1:
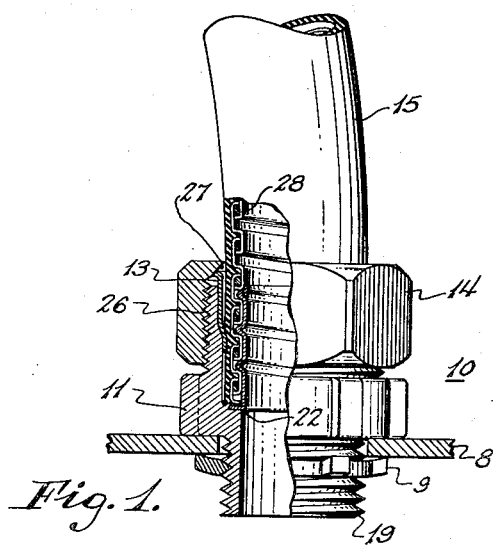
Fig. 1 is a longitudinal view, partly in section, of a flexible metal conduit hose connected to a connector incorporating the features of our invention.
Figures 7, 8:
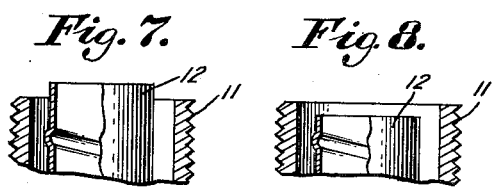
Figs. 7 and 8 illustrate modifications of the preferred embodiment in which the concentric sleeve in the first instance protrudes axially from the connector body and in the second instance terminates within the connector body.

A sealed tight connector 10 consists of a connector body 11, an insert or sleeve 12, a metallic gland ring 13 and a nut 14.

Body 11 is a cylindrically shaped unit threaded at both ends 16, 19 and may be made of malleable cast iron. Threaded end 19 is adapted for engagement with junction boxes, switch boxes, or other fittings to which connection is desired. A lock washer 9 is generally threaded to end 19 to effect connection with the fitting. An intermediate, annular outer surface 17, outfitted with mutually spaced apart ribs 18, is provided for a wrench or other like tool to grip connector body 11. Threaded end 16 extends from surface 17; end 16 is adapted to threadedly engage the inner threaded surface 26 of nut 14.

A cylindrically shaped sleeve 12 is permanently locked at its flanged end 22 to body 11. Sleeve 12 has an annular flange at its end 22, and a shallow spiraled thread along its cylindrical wall 24. The diameter of inner surface 23 of sleeve 12 is slightly greater than the diameter of inner surface 30 at end 19. Otherwise, inner surface 30 at the point of juncture with sleeve 12 would act as an abutment to the wire snaked therethrough. The spiral threaded outer surface 24 of sleeve 12 is gauged to engage with the armored convolutions 28 of conduit 15. Sleeve 12 is permanently and firmly attached to body 11; flange end 22 of sleeve 12 is sandwiched between the two annular ledges 20, 31 of body 11. In the illustrated embodiment, sleeve 12 extends axially to terminate in the same plane with end 16. As an alternative, sleeve 12 may be shorter in axial length so that it terminates within connector body 11, or it may be longer in axial length so that it protrudes out from end 16. Extending sleeve 12 much beyond end 16 should be avoided because sleeve 12 is not flexible and therefore prevents the bending of the portion of the hose surrounding sleeve 12. Yet it is important that the sleeve be long enough axially to provide a positive ground for the armored convolutions of the hose when the connector is tightened. Sleeve 12 also provides a support for hose 15 at the connector. Generally, a sleeve which terminates in the same plane of the edge of end 16 as illustrated is adequate.

The respective diameters of inner surface 32 of body 11 and outer threaded surface 24 of sleeve 12 are dimensioned to allow just enough clearance to permit a standard liquid tight flexible conduit 15 to be slipped into the connector between sleeve 12 and body 11 without the need of twisting or turning of hose 15. In coupling to a connector 10, conduit 15 is pushed straight into connector 10 until the engaging end of conduit 15 is caused to abut against ledge 20 or the upper exposed side of flange 22 as illustrated in Fig. 1.

Thin resilient metallic ring 13, cylindrical in shape, is designed to be passed over conduit 15 and is adapted to be wedged between the conduit and the inner surface of body 11 when nut 14 is drawn up on threaded end 16. Ring 13 has an annular flange 25 extending outwardly which flange is engaged by the bevelled surface 27 of nut 14 when the latter is drawn up. When nut 14 is drawn up on end 16 it pushes ring 13 axially deeper into connector body 11. Ring 13 is then squeezed inwardly by an annular tapered bore surface 33 close to the point of entry at end 16.

The diameter of inner surface 21, at the mouth of end 16, is greater than the diameter of inner surface 32. The two surfaces are joined by an annular surface 33 which is tapered inwardly from surface 21 to surface 32. In the illustrated embodiment, surface 33 is tapered 20 degrees with respect to the longitudinal axis of body 11. A tapered surface or its equivalent such as a rounded or curved rib is desirable because it does not act as an abutment which would prevent ring 13 from being pushed deeper into body 11. The diameter of ring 13 is slightly less than the diameter of surface 21, but greater than the diameter of surface 32. Accordingly when ring 13 is dropped into body 11, the lower end of the ring rests against tapered surface 33.

Since ring 13 is pushed axially past tapered surface 33 when nut 13 is drawn up, the inwardly radial pressure of surfaces 32, 33 against the cylindrical wall of ring 13 causes the lower end of the wall to curve inwardly and become permanently bound to conduit 15. The grip effected by ring 13 collapsing against hose 15 as described, resists pull out forces acting on the hose. From Fig. 1, it can be seen that the lower end of ring 13 digs into sheath 29 of hose 15 and that threaded nut 14 causes ring 13 to exert a downward force against the hose. This downward force is in a direction to oppose any upward force which would tend to pull the house out from connector body 11.

Although the collapsed ring 13 is permanently bound to hose 15, the connection to connector 10 may be repeatedly disconnected and connected as the need arises. To disconnect, nut 14 is disengaged and then hose 15 is pulled out from body 11. Collapsing ring 13 may be avoided by hand tightening nut 15 to body 11 in lieu of wrench tightening. However a hand tightened connection may be objectionable for some installations because it does not always effect a perfect seal tight connection.

Figure 3:
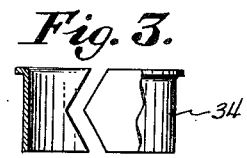
Figs. 3 and 4 are views of alternative designs for the gland ring.

There are other ways to avoid permanently collapsing the ring. A split ring 34, as illustrated in Fig. 3, may be used in lieu of ring 13. Split ring 34 is essentially ring 13 with a section of its cylindrical wall removed. The squeeze action of surfaces 32, 33 will cause the complementary shaped sides of the split ring 34 to close toward each other. However the wall of ring 34 will not collapse. This arrangement permits the reuse of the connector with the same ring for different connections.

Figure 4:
Figure 2:
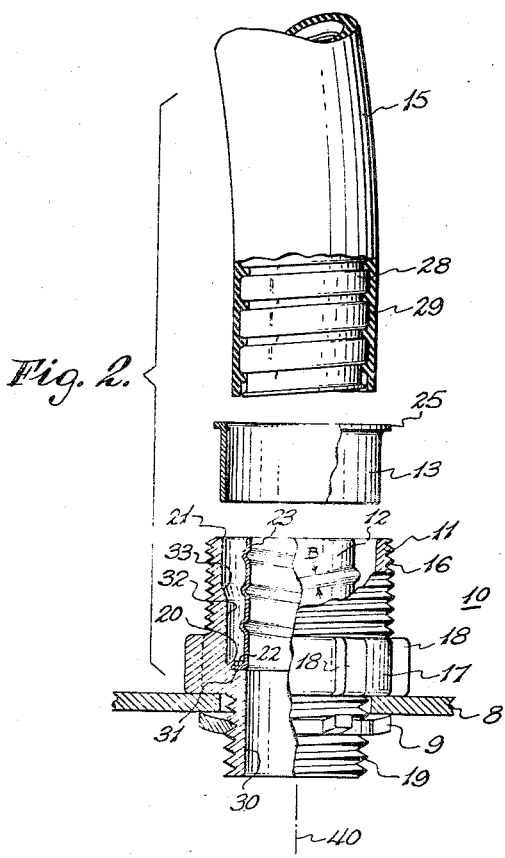
Fig. 2 is a longitudinal view, partly in section, illustrating the individual elements of the connector of Fig. 1.

Another alternative ring design is shown in Fig. 4. The cylindrical wall of ring 35 has a profile which corresponds to the profile of inner surface 21 and 32 joined by tapered surface 33. Ring 35 may be split or fully annular. This design prevents the ring from cutting into the insulation of hose 15. The above described rings are made preferably of thin, resilient metallic material such as brass. The thin material permits nut 14 to be drawn up by hand. A hand tight connection becomes progressively more difficult for thicker rings. The overall longitudinal length of the rings is approximately twice the longitudinal distance from the end of threaded surface 16 to the tapered surface 33. This ring length allows enough of the ring to protrude beyond end 16 so that it can be readily engaged by nut 14. The longitudinal length of the above described rings may be approximately 7/16 inch.

The spiral thread along the outer surface 24 of sleeve 12 is made relatively shallow and round. This permits one to push the conduit hose 15 straight over sleeve 12 until the inner end of hose 15 abuts against the ledge 20 or flange 22. The spiral threads become effective when the nut 14 is drawn up to cause ring 13 to clamp to hose 15. Spiral threads 24 then offer sufficient feel to provide a good positive ground connection to the armored convolutions 28.

Figure 5:
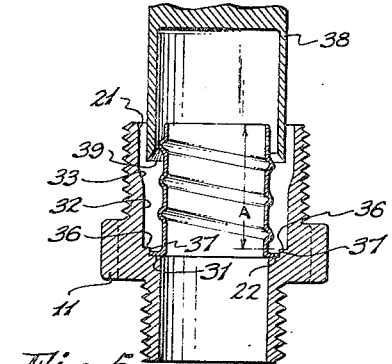
Fig. 5 is a longitudinal view, in section, of the sleeve positioned in the connector body in preparation of staking by the annular staking tool.
Figure 6:
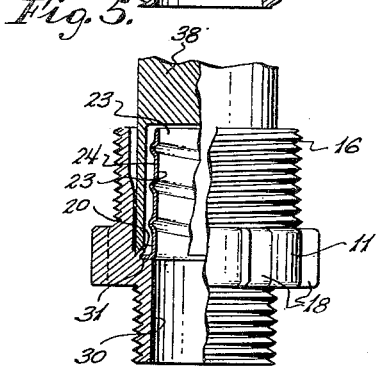
Fig. 6 is a longitudinal view, partly in section, of the sleeve and connector body being acted upon by the staking tool.

For the proper operation of connector 10 it is necessary that sleeve 12 be firmly fastened to body 11; the former is fastened to the latter during the manufacture of connector 10. After sleeve 12 is dropped into body 11, annular ledge 36 and wall 37 surrounding flange 22 is staked until it grips flange 22 and thereby permanently locks sleeve 12 to body 11. Reference is now made to Figs. 5 and 6. Threaded end 16 of body 11 prior to staking has an annular interior consisting of longitudinal surface 21, tapered surface 33, longitudinal surface 32, an annular horizontal ledge 36 separated from the innermost ledge 31 by a cylindrical wall 37. The diameter of wall 37 is slightly larger than flange 22. Sleeve 12 is dropped into body 11 with flange 22 resting on ledge 31. A stake punch 38 consisting of an annular cutting tool which is provided with an inside tapered surface 39, approximately 45° with respect to the longitudinal axis, is brought to bear down upon ledge 36 with great force. Staking tool 38 is dimensioned so that its sharp hard point strikes and cuts into ledge 36. The tapered face 39 of tool 38 causes the staked material to fold over upon flange 22 and thus firmly locks sleeve 12 in position.

The folded ledge formed by the staking tool 38 is in the foregoing portion of the description identified as 20.

The prescribed dimensions for the components of seal tight connector 10 will vary and depend upon the size of the standard conduit 15 to be connected thereto. It is therefore thought that for a better understanding of the invention, that it would be desirable to set forth the dimensions for critical parts of an illustrative embodiment for the connector. The following dimensions were used for a ½″ seal tight connector. The diameter and longitudinal or axial length of surface 21 are, respectively, .911 and ⅜₁₆ inch. The diameters of surfaces 32 and 37 are, respectively, .850 and .787 inch. Surface 33 is tapered at an angle of 20 degrees with respect to a line parallel to longitudinal axis 40. The axial depth of ledge 36 from the edge of end 16, shown as dimension A, is .625 of an inch. The axial length from ledge 36 to ledge 31 is .057 of an inch.

Sleeve 12 for the ½ inch connector is made from .018 inch brass stock (#25 B. & S. gauge) and has an 1¹⁄₁₆ inch axial length. The outside diameter of the unthreaded portion of sleeve 12 is formed to be .588 of an inch. This dimension is also the minor or root diameter of the spiraled thread along surface 24. The major diameter of the spiraled thread is .638 inch and it is pitched for five threads per inch. For the foregoing dimensions sleeve 12 accommodates 1½ full threads along surface 24.

For convenience of use, the spiraled thread along surface 24 does not start at the edge of the upper end of sleeve 12, nor does it extend down to the flanged end of sleeve 12. A thread starting at the upper edge of sleeve 12 might interfere with the unrestrained insertion of hose 15 into the assembled connector 10. Furthermore, there is no functional reason for extending the thread down to the lower flange end of sleeve 12. Consequently, the illustrated embodiment shows the thread centrally disposed longitudinally along surface 24; and having the top and bottom ends of the thread spaced the same distance, respectively, from the top and bottom of sleeve 12. The width or base of the thread, indicated as reference letter B, is .062 of an inch, and the diameter of inner surface 23 is .552 of an inch.

Gland ring 13 for the ½ inch connector is made of .0226 inch dead soft brass stock (#23 B. & S. gauge). Its cylindrical wall has an outer diameter of .904, +0 and —.005, of an inch. The flange end of ring 13 has a .995 of an inch diameter. Ring 13 has a longitudinal length of ⁷⁄₁₆ of an inch.

Although not shown in the figures, it is within the scope of the invention to shape body 11 so that it is bent in the region of the intermediate section 17 but below ledge 31. Thus, without interfering with the seal tight end 16 of connector 10, a 45° or 90° elbow may be effected as well as the straight connector as illustrated in the figures.

From the preceding description it is seen that the connector is simple to use. In preparation for use, ring 13 is dropped into body 11 so that the edge of its cylindrical wall rests on tapered surface 33. The flange end 25 projects outward from body 11. Nut 14 is drawn up along threaded surface 16 until a slight pressure is felt. The pressure is caused by bevel 27 bearing on flange 25. Connector 10 is now assembled for use. Generally, its ends 19 is first connected to a junction box or other fitting 8. The hose end is prepared for connection by cutting square the end of hose 15 to be inserted into connector 10, after which hose 15 is inserted into connector 10 and nut 14 is drawn up tight by hand or wrench. In using connector 10, it is noted that once the connector per se is completely assembled, it need not be disassembled to complete the hose connection.

It is also seen that the parts that constitute connector 10 are simple to make and assemble. Each of the parts may be mass produced by automatic machines requiring a minimum of surveillance. The method of staking the sleeve to the body emphasizes the economy of manufacture made possible by the design of our invention. The described embodiments set forth herein should not be taken in any limiting sense but as illustrative of the application of our invention.

What is claimed is:

1. A liquid tight connector for conduit hose reinforced internally by armored convolutions comprising, a cylindrical connector body having a centrally disposed bore extending therethrough, said bore being adapted to receive said hose at one end of said body, the internal surface of said bore adjacent the hose entrance being of a first diameter and extending relatively a short distance into the interior of said body, said bore having an internal surface of a second diameter starting near the inner end of said first diameter surface and extending into the interior of the body relatively a long axial distance and terminating at a remote inner annular staked ledge, said second diameter being slightly less than said first diameter, the aforementioned internal surfaces being joined by an annular tapered internal surface, a metallic cylindrical sleeve extending concentrically within said second diameter internal surface, said sleeve having a flanged end firmly fastened to said body by said staked ledge, said sleeve having a shallow spiraled thread along its outer surface gauged to engage the armored convolutions of said hose, the diameters of said sleeve and bore being predetermined to permit said hose to be pushed axially straight in and between said sleeve and internal surfaces to effect a telescopic engagement with said connector, said body having an outer threaded surface at said hose receiving end, a connector nut having an internal threaded surface at one end and a bevelled surface to the rear thereof, and a thin cylindrical metallic gland ring adapted to fit over said hose, said ring having a cylindrical side wall of diameter greater than said second diameter but less than said first diameter, said ring having a flanged end exposed for engagement with the bevelled surface of said nut when said ring is wedged concentrically between said hose and the internal bore surface, said ring being squeezed to grip positively said hose to effect the liquid tight connection by the constricting action of said tapered and second diameter surfaces against the cylindrical wall of said ring as the ring is pushed past said tapered surface and deeper into the connector by drawing up said nut on the outer threaded surface of said body, and whereby the gland ring grip causes the shallow threads of said sleeve to engage said armored convolutions of said hose to provide a positive ground therefor.

2. A connector as defined in claim 1, wherein the cylindrical wall of said ring is split to avoid permanently collapsing said ring inwardly against said hose when said nut is drawn up to effect the liquid-tight connection.

3. A connector as defined in claim 1, wherein said cylindrical wall of said ring has a first diameter section adjacent its flanged end and a second diameter section at the other end of said wall, said first and second diameter sections of said wall being joined by a tapered section, the diameter of said first section being slightly greater than the diameter of said second section, whereby the profile of said ring corresponds to that of the internal surfaces of the bore at the tapered region thereof.

4. A connector as defined in claim 1, wherein said tapered internal surface of said bore is twenty degrees with the longitudinal axis of said body.

5. A connector as defined in claim 1, wherein the end of said sleeve adjacent the hose entrance to said bore terminates substantially in the same plane with the end of said body.

6. A connector as defined in claim 1, wherein the end of said sleeve adjacent the hose entrance to said bore protrudes axially from said body.

7. A connector as defined in claim 1, wherein the end of said sleeve adjacent the hose entrance to said bore terminates within said body.

8. A liquid tight connector adapted for connection to conduit hose reinforced internally by armored convolutions comprising, a cylindrical connector body having a centrally disposed bore extending therethrough, said bore being adapted to receive said hose at one end of said body, the internal surface of said bore at the extremity of its receiving end being of a first diameter and extending into the interior of said body, said bore having an internal surface of a second diameter starting near the inner end of said first diameter surface and extending into the interior of said body, said second diameter being less than said first diameter, said bore having an annular surface of decreasing diameter joining the aforementioned surfaces of said bore, an annular staked ledge at the inner remote end of said second diameter surface, a metallic cylindrical sleeve extending concentrically within and along the axial length of said second diameter surface, said sleeve having a flanged end firmly fastened to said body by said staked ledge, said sleeve having a shallow spiraled thread along its side wall gauged to engage the armored convolutions of said hose, the diameters of said sleeve and bore being predetermined to permit said hose to be inserted axially straight in and between said sleeve and bore surfaces to effect a telescopic engagement with said connector body, said body having an outer threaded surface at said hose receiving end, a nut having an internal threaded surface and a bevelled surface to the rear thereof, and a thin metallic gland ring adapted to fit over said hose, said ring having a cylindrical side wall of uniform diameter slightly greater than said second diameter but less than said first diameter of said bore surfaces, said ring having a flanged end exposed for engagement with the bevelled surface of said nut when said ring is wedged between said hose and the internal bore surfaces, said ring being squeezed to grip positively said hose to effect the liquid tight connection by the constricting action of said annular surface of decreasing diameter and said second diameter surfaces against said cylindrical wall of said ring as said ring is being pushed past said internal surfaces and deeper into the interior of said body by drawing up said nut on the outer threaded surface of said body, and whereby said gland ring grip causes the shallow threads of said sleeve to engage said armored convolutions of said hose to provide a positive ground therefor.

9. A liquid tight connector adapted for connection to conduit hose reinforced internally by armored convolutions comprising, a cylindrical connector body having a centrally disposed bore extending therethrough, said bore being adapted to receive said hose at one end of said body, the internal surface of said bore at the extremity of its receiving end being of a first diameter and extending into the interior of said body, said bore having an internal surface of a second diameter starting near the inner end of said first diameter surface and extending into the interior of said body, said second diameter being less than said first diameter, said bore having a surface of decreasing diameter joining the aforementioned surfaces of said bore, a staked ledge at the inner remote end of said second diameter surface, a metallic cylindrical sleeve extending concentrically within and along the axial length of said second diameter surface, said sleeve having a flanged end firmly fastened to said body by said staked ledge, said sleeve having a shallow spiraled thread along its side wall gauged to engage the armored convolutions of said hose, the diameters of said sleeve and bore being predetermined to permit said hose to be inserted axially straight in and between said sleeve and bore surfaces to effect a telescopic engagement with said connector body, a thin metallic gland ring adapted to fit over said hose, said ring having a cylindrical side wall of uniform diameter slightly greater than said second diameter but less than said first diameter of said bore surfaces, and means for forcing said ring into a locked wedged engagement between said hose and said internal bore surfaces, whereby said ring is squeezed to grip positively said hose to effect the liquid tight connection by the constricting action of said surface of decreasing diameter and said second diameter surface against said cylindrical wall of said ring as said ring is being pushed past said internal surfaces and deeper into the interior of said body by said means and whereby said gland ring grip causes the shallow threads of said sleeve to engage said armored convolutions of said hose to provide a positive ground therefor.

10. A liquid tight connector adapted for connection to conduit hose reinforced internally by armored convolutions comprising, a cylindrical connector body having a centrally disposed bore extending therethrough, said bore being adapted to receive said hose at one end of said body, the internal surface of said bore at the extremity of its receiving end being of a first diameter and extending into the interior of said body, said bore having a second internal surface starting near the inner end of said first diameter surface and extending into the interior of said body, said bore having a surface of decreasing diameter joining the aforementioned surfaces of said bore, a staked ledge at the inner remote end of said second internal surface, a metallic cylindrical sleeve extending concentrically within said bore, said sleeve having a flanged end firmly fastened to said body by said staked ledge, said sleeve having a shallow spiraled thread along its side wall gauged to engage the armored convolutions of said hose, the diameters of said sleeve and bore being predetermined to permit said hose to be inserted axially straight in and between said sleeve and bore surfaces to effect a telescopic engagement with said connector body, a thin metallic gland ring adapted to fit over said hose, said ring having a cylindrical side wall of uniform diameter equal to an intermediate diameter of that section of the bore of decreasing diameter, and means for forcing said ring into a locked wedged engagement between said hose and said internal bore surfaces, whereby said ring is squeezed to grip positively said hose to effect the liquid tight connection by the constricting action of said surface of decreasing diameter against said cylindrical wall of said ring as said ring is being pushed past said internal surface and deeper into the interior of said body by said means, and whereby said gland ring grip causes the shallow threads of said sleeve to engage said armored convolutions of said hose to provide a positive ground therefor.

11. A liquid tight connector adapted for connection to conduit hose reinforced internally by armored convolutions comprising, a connector body having an internally disposed bore surface extending longitudinally therethrough, said bore being adapted to receive said hose at one end of said body, said bore being provided with sections of first and second diameters joined by a tapered section, said first diameter section being disposed adjacent the hose receiving end of said connection body and the dimension of said second diameter being less than said first diameter, a cylindrical sleeve extending concentrically within and along said bore and having an inner end terminating in the interior of said bore remotely from said hose receiving end of said body, means in said connector body for permanently holding said sleeve in said bore, shallow thread means along the side wall of said sleeve and being gauged to engage the armored convolutions of said hose, the diameter of said sleeve and bore sections being predetermined to permit axially straight insertion of said hose into said connector body between said sleeve and bore surface, a thin resilient gland ring adapted to fit over said hose, said ring having a cylindrical side wall of diameter greater than said second diameter but less than said first diameter, and means forming a part of said connector and for forcing and maintaining said ring into locked wedged engagement between said hose and internal bore surface, whereby said ring is squeezed to grip positively said hose to effect a liquid tight connection by the constricting action of said bore surface of said tapered section and said second diameter section against the wall of said ring as said ring is pushed past said constricting surface sections and deeper into the interior of said body, and whereby said gland ring grip causes said thread means of said sleeve to engage said armored convolutions of said hose to provide a positive ground thereat.

12. Apparatus as defined in claim 11 wherein, said holding means in said body comprises, a staked ledge formed to grip the inner end of said sleeve.

13. A liquid tight connector adapted for connection to conduit hose reinforced internally by armored convolutions comprising, a connector body having an internally disposed bore surface extending longitudinally therethrough, said bore being adapted to receive said hose at one end of said body, said bore being provided with an interior section of reduced diameter spaced from the hose receiving end of said connector body by a bore section of relatively larger diameter, a cylindrical sleeve extending concentrically within and along said bore and having an inner end terminating in the interior of said bore remotely from said hose receiving end of said body, means in said connector body for permanently holding said sleeve in said bore, shallow thread means along the side wall of said sleeve and being gauged to engage the armored convolutions of said hose, the diameter of said sleeve and bore sections being predetermined to permit axially straight insertion of said hose into said connector body between said sleeve and bore surface, a thin resilient gland ring adapted to fit over said hose, said ring having a cylindrical side wall of diameter slightly greater than said reduced diameter but less than said larger diameter, and means forming a part of said connector and for forcing and maintaining said ring into locked wedged engagement between said hose and internal bore surface whereby said ring is squeezed to grip positively said hose to effect a liquid tight connection by the constricting action of said reduced diameter bore section against the wall of said ring as said ring is pushed past said constricting surface and deeper into the interior of said body, and whereby said gland ring grip causes said threaded means of said sleeve to engage said armored convolutions of said hose to provide a positive ground thereat.

14. A liquid tight connector adapted for connection to conduit hose reinforced internally by armored convolutions comprising, a connector body having an internally disposed bore surface extending longitudinally therethrough, said bore being adapted to receive said hose at one end of said body, a cylindrical sleeve extending concentrically within and along said bore and having an inner end terminating in the interior of said bore remotely from the receiving end of said body, means in said connector body for permanently holding said sleeve in said bore, said sleeve having a shallow thread means along its side wall gauged to engage the armored convolutions of said hose, the diameter of said sleeve and bore surface being predetermined to permit axially straight insertion of said hose into said connector between said sleeve and bore surface, a thin resilient gland ring adapted to fit over said hose, means along said bore surface spaced from said receiving end of said body and defining a constricting throat of diameter less than the diameter of said bore adjacent said receiving end of said body, said ring having a cylindrical side wall of diameter slightly greater than said constricting throat means, and means forming a part of said connector and for forcing and maintaining said ring into locked wedged engagement between said hose and internal bore surface whereby said ring is squeezed to grip positively said hose to effect a liquid tight connection by the constricting action of said constricting means against the wall of said ring as said ring is forced past said constricting means and deeper into the interior of said body, and whereby said gland ring grip causes said threaded means of said sleeve to engage said armored convolutions of said hose to provide a positive ground thereat.

References Cited in the file of this patent

UNITED STATES PATENTS

| | | |
|---|---|---|
| 2,059,040 | Scholtes | Oct. 27, 1936 |
| 2,090,250 | Cowles | Aug. 17, 1937 |
| 2,090,251 | Cowles | Aug. 17, 1937 |
| 2,328,298 | Santhoff | Aug. 31, 1943 |
| 2,330,841 | Parker | Oct. 5, 1943 |

FOREIGN PATENTS

| | | |
|---|---|---|
| 126,032 | Austria | Nov. 13, 1930 |
| 1,014,789 | France | June 18, 1952 |